(12) United States Patent
Moorehead et al.

(10) Patent No.: US 7,431,088 B2
(45) Date of Patent: Oct. 7, 2008

(54) METHODS OF CONTROLLED ACIDIZATION IN A WELLBORE

(75) Inventors: Alan W. Moorehead, Houston, TX (US); William W. Shumway, Houton, TX (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 225 days.

(21) Appl. No.: 11/336,475

(22) Filed: Jan. 20, 2006

(65) Prior Publication Data

US 2007/0169938 A1 Jul. 26, 2007

(51) Int. Cl.
*E21B 43/27* (2006.01)
(52) U.S. Cl. .................. 166/307; 166/282; 166/304
(58) Field of Classification Search .................. None
See application file for complete search history.

(56) References Cited

U.S. PATENT DOCUMENTS

| | | | |
|---|---|---|---|
| 1,922,154 A | 8/1933 | De Groote | |
| 2,050,932 A | 8/1936 | De Groote | |
| 2,059,459 A | 11/1936 | Hund et al. | |
| 2,206,187 A | 7/1940 | Herbsman | |
| 2,238,671 A | 4/1941 | Woodhouse | |
| 2,681,889 A | 6/1954 | Menaul et al. | |
| 2,703,316 A | 3/1955 | Palmer | |
| 2,863,832 A | 12/1958 | Perrine | |
| 2,910,436 A | 10/1959 | Fatt et al. | |
| 3,173,484 A | 3/1965 | Huitt et al. | |
| 3,195,635 A | 7/1965 | Fast | |
| 3,272,650 A | 9/1966 | Mac Vittie | |
| 3,302,719 A | 2/1967 | Fischer | |
| 3,364,995 A | 1/1968 | Atkins et al. | |
| 3,366,178 A | 1/1968 | Malone et al. | |
| 3,455,390 A | 7/1969 | Gallus | |
| 3,630,285 A | 12/1971 | Claytor, Jr. et al. | |
| 3,784,585 A | 1/1974 | Schmitt et al. | |
| 3,819,525 A | 6/1974 | Hattenbrun | |
| 3,828,854 A | 8/1974 | Templeton et al. | |
| 3,836,465 A | 9/1974 | Rhudy et al. | |
| 3,868,998 A | 3/1975 | Lybarger et al. | |
| 3,912,692 A | 10/1975 | Casey et al. | |
| 3,948,672 A | 4/1976 | Harnsberger | |
| 3,955,993 A | 5/1976 | Curtice | |
| 3,960,736 A * | 6/1976 | Free et al. ............ 507/216 | |
| 3,968,840 A | 7/1976 | Tate | |
| 3,986,355 A | 10/1976 | Klaeger | |
| 3,998,272 A | 12/1976 | Maly | |
| 3,998,744 A | 12/1976 | Arnold et al. | |
| 4,010,071 A | 3/1977 | Colegrove | |
| 4,068,718 A | 1/1978 | Cooke, Jr. et al. | |
| 4,169,798 A | 10/1979 | DeMartino | |
| 4,172,066 A | 10/1979 | Zweigle et al. | |
| 4,261,421 A | 4/1981 | Watanabe | |
| 4,265,673 A | 5/1981 | Pace et al. | |
| 4,299,825 A | 11/1981 | Lee | |
| 4,387,769 A | 6/1983 | Erbstoesser et al. | |
| 4,460,052 A | 7/1984 | Gockel | |
| 4,470,915 A | 9/1984 | Conway | |
| 4,498,995 A | 2/1985 | Gockel | |
| 4,502,540 A | 3/1985 | Byham | |
| 4,506,734 A | 3/1985 | Nolte | |
| 4,521,316 A | 6/1985 | Sikorski | |
| 4,526,695 A | 7/1985 | Erbstoesser et al. | |
| 4,632,876 A | 12/1986 | Laird et al. | |
| 4,694,905 A | 9/1987 | Armbruster | |
| 4,715,967 A | 12/1987 | Bellis | |
| 4,716,964 A | 1/1988 | Erbstoesser et al. | |
| 4,767,706 A | 8/1988 | Levesque | |
| 4,772,346 A | 9/1988 | Anderson et al. | |
| 4,785,884 A | 11/1988 | Armbruster | |
| 4,793,416 A | 12/1988 | Mitchell | |
| 4,797,262 A | 1/1989 | Dewitz | |
| 4,809,783 A | 3/1989 | Hollenbeck et al. | |
| 4,817,721 A | 4/1989 | Pober | |
| 4,822,500 A | 4/1989 | Dobson, Jr. et al. | |
| 4,829,100 A | 5/1989 | Murphey et al. | |

(Continued)

FOREIGN PATENT DOCUMENTS

EP 0 510 762 B1 10/1992

(Continued)

OTHER PUBLICATIONS

Todd, B. et al., "A Chemical "Trigger" Useful for Oilfield Applications", dated 2005, SPE 92709.

(Continued)

*Primary Examiner*—Zakiya W. Bates
(74) *Attorney, Agent, or Firm*—Craig W. Roddy; Baker Botts, LLP.

(57) ABSTRACT

An improved acidization method is provided in which an aqueous solution comprising one or more esters or polyesters of lactic acid or of glycerol is placed in a well where the esters or polyesters undergo hydrolysis. The hydrolysis of the esters or polyesters occurs at a slower reaction rate than that of several other known acidization esters, such as diethyleneglycol diformate, at temperatures higher than 60° C. or even higher than 100° C. Thus, the solution may be distributed substantially throughout a region in the well where acidization is required before hydrolysis is completed, despite being exposed to relatively high temperatures.

22 Claims, 6 Drawing Sheets

U.S. PATENT DOCUMENTS

| | | | |
|---|---|---|---|
| 4,836,940 A | 6/1989 | Alexander | |
| 4,843,118 A | 6/1989 | Lai et al. | |
| 4,848,467 A | 7/1989 | Cantu et al. | |
| 4,863,980 A | 9/1989 | Cowan et al. | |
| 4,886,354 A | 12/1989 | Welch et al. | |
| 4,894,231 A | 1/1990 | Moreau et al. | |
| 4,957,165 A | 9/1990 | Cantu et al. | |
| 4,961,466 A | 10/1990 | Himes et al. | |
| 4,986,353 A | 1/1991 | Clark et al. | |
| 4,986,354 A | 1/1991 | Cantu et al. | |
| 4,986,355 A | 1/1991 | Casad et al. | |
| 5,034,139 A | 7/1991 | Reid et al. | |
| 5,082,056 A | 1/1992 | Tackett, Jr. | |
| 5,142,023 A | 8/1992 | Gruber et al. | |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A * | 5/1993 | Dovan | 405/129.3 |
| 5,216,050 A | 6/1993 | Sinclair | |
| 5,247,059 A | 9/1993 | Gruber et al. | |
| 5,249,628 A | 10/1993 | Surjaatmadja | |
| 5,251,697 A | 10/1993 | Shuler | |
| 5,295,542 A | 3/1994 | Cole et al. | |
| 5,304,620 A | 4/1994 | Holtmyer et al. | |
| 5,314,031 A | 5/1994 | Hale et al. | |
| 5,325,923 A | 7/1994 | Surjaatmadja et al. | |
| 5,330,005 A | 7/1994 | Card et al. | |
| 5,359,026 A | 10/1994 | Gruber | |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | |
| 5,460,226 A | 10/1995 | Lawton et al. | |
| 5,464,060 A | 11/1995 | Hale et al. | |
| 5,475,080 A | 12/1995 | Gruber et al. | |
| 5,484,881 A | 1/1996 | Gruber et al. | |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | |
| 5,499,678 A | 3/1996 | Surjaatmadja et al. | |
| 5,501,276 A | 3/1996 | Weaver et al. | |
| 5,505,787 A | 4/1996 | Yamaguchi | |
| 5,512,071 A | 4/1996 | Yam et al. | |
| 5,536,807 A | 7/1996 | Gruber et al. | |
| 5,544,705 A | 8/1996 | Jones et al. | |
| 5,555,936 A | 9/1996 | Pirri et al. | |
| 5,591,700 A | 1/1997 | Harris et al. | |
| 5,594,095 A | 1/1997 | Gruber et al. | |
| 5,602,083 A | 2/1997 | Gabrysch et al. | |
| 5,604,186 A | 2/1997 | Hunt et al. | |
| 5,607,905 A | 3/1997 | Dobson, Jr. et al. | |
| 5,613,558 A | 3/1997 | Dillenbeck | |
| 5,670,473 A | 9/1997 | Scepanski | |
| 5,678,632 A | 10/1997 | Moses et al. | |
| 5,697,440 A | 12/1997 | Weaver et al. | |
| 5,698,322 A | 12/1997 | Tsai et al. | |
| 5,723,416 A | 3/1998 | Liao | |
| 5,765,642 A | 6/1998 | Surjaatmadja | |
| 5,783,527 A | 7/1998 | Dobson, Jr. et al. | |
| 5,791,415 A | 8/1998 | Nguyen et al. | |
| 5,799,734 A | 9/1998 | Norman et al. | |
| 5,833,000 A | 11/1998 | Weaver et al. | |
| 5,849,401 A | 12/1998 | El-Afandi et al. | |
| 5,853,048 A | 12/1998 | Weaver et al. | |
| 5,893,416 A | 4/1999 | Read | |
| 5,908,073 A | 6/1999 | Nguyen et al. | |
| 5,916,849 A | 6/1999 | House | |
| 5,924,488 A | 7/1999 | Nguyen et al. | |
| 5,964,291 A | 10/1999 | Bourne et al. | |
| 5,977,030 A | 11/1999 | House | |
| 5,979,557 A | 11/1999 | Card et al. | |
| 5,996,693 A | 12/1999 | Heathman | |
| 6,004,400 A | 12/1999 | Bishop et al. | |
| 6,024,170 A | 2/2000 | McCabe et al. | |
| 6,028,113 A | 2/2000 | Scepanski | |
| 6,047,772 A | 4/2000 | Weaver et al. | |
| 6,110,875 A | 8/2000 | Tjon-Joe-Pin et al. | |
| 6,114,410 A | 9/2000 | Betzold | |
| 6,123,159 A | 9/2000 | Brookey et al. | |
| 6,123,965 A | 9/2000 | Jacob et al. | |
| 6,131,661 A | 10/2000 | Conner et al. | |
| 6,135,987 A | 10/2000 | Tsai et al. | |
| 6,143,698 A | 11/2000 | Murphey et al. | |
| 6,148,917 A | 11/2000 | Brookey et al. | |
| 6,162,766 A | 12/2000 | Muir et al. | |
| 6,169,058 B1 | 1/2001 | Le et al. | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 | 4/2001 | Nguyen et al. | |
| 6,209,646 B1 | 4/2001 | Reddy et al. | |
| 6,214,773 B1 | 4/2001 | Harris et al. | |
| 6,242,390 B1 | 6/2001 | Mitchell et al. | |
| 6,260,622 B1 | 7/2001 | Blok et al. | |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | |
| 6,387,986 B1 | 5/2002 | Moradi-Araghi et al. | |
| 6,390,195 B1 | 5/2002 | Nguyen et al. | |
| 6,394,185 B1 | 5/2002 | Constien | |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,432,885 B1 | 8/2002 | Vollmer | |
| 6,454,003 B1 | 9/2002 | Chang et al. | |
| 6,485,947 B1 | 11/2002 | Rajgarhia et al. | |
| 6,488,763 B2 | 12/2002 | Brothers et al. | |
| 6,494,263 B2 | 12/2002 | Todd | |
| 6,508,305 B1 | 1/2003 | Brannon et al. | |
| 6,509,301 B1 | 1/2003 | Vollmer | |
| 6,527,051 B1 | 3/2003 | Reddy et al. | |
| 6,554,071 B1 | 4/2003 | Reddy et al. | |
| 6,566,310 B2 | 5/2003 | Chan | |
| 6,569,814 B1 | 5/2003 | Brady et al. | |
| 6,578,630 B2 | 6/2003 | Simpson et al. | |
| 6,599,863 B1 | 7/2003 | Palmer et al. | |
| 6,667,279 B1 | 12/2003 | Hessert et al. | |
| 6,669,771 B2 | 12/2003 | Tokiwa et al. | |
| 6,681,856 B1 | 1/2004 | Chatterji et al. | |
| 6,686,328 B1 | 2/2004 | Binder | |
| 6,691,780 B2 | 2/2004 | Nguyen et al. | |
| 6,702,023 B1 | 3/2004 | Harris et al. | |
| 6,710,019 B1 | 3/2004 | Sawson et al. | |
| 6,716,797 B2 | 4/2004 | Brookey et al. | |
| 6,737,385 B2 | 5/2004 | Todd et al. | |
| 6,761,218 B2 | 7/2004 | Nguyen et al. | |
| 6,763,888 B1 | 7/2004 | Harris et al. | |
| 6,764,981 B1 | 7/2004 | Eoff et al. | |
| 6,793,018 B2 | 9/2004 | Dawson et al. | |
| 6,793,730 B2 | 9/2004 | Reddy et al. | |
| 6,806,235 B1 | 10/2004 | Mueller et al. | |

| | | |
|---|---|---|
| 6,817,414 B2 | 11/2004 | Lee |
| 6,818,594 B1 | 11/2004 | Freeman et al. |
| 6,837,309 B2 | 1/2005 | Boney et al. |
| 6,883,608 B2 | 4/2005 | Parlar et al. |
| 6,896,058 B2 | 5/2005 | Munoz, Jr. et al. |
| 6,904,971 B2 | 6/2005 | Brothers et al. |
| 6,949,491 B2 | 9/2005 | Cooke, Jr. |
| 6,959,767 B2 | 11/2005 | Horton et al. |
| 6,978,838 B2 | 12/2005 | Parlar et al. |
| 6,981,552 B2 | 1/2006 | Reddy et al. |
| 6,983,801 B2 | 1/2006 | Dawson et al. |
| 6,987,083 B2 | 1/2006 | Phillippi et al. |
| 6,997,259 B2 | 2/2006 | Nguyen |
| 7,007,752 B2 | 3/2006 | Reddy et al. |
| 7,021,337 B2 | 4/2006 | Markham |
| 7,032,663 B2 | 4/2006 | Nguyen |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,063,151 B2 | 6/2006 | Nguyen et al. |
| 7,066,258 B2 | 6/2006 | Justus et al. |
| 7,069,994 B2 | 7/2006 | Cooke, Jr. |
| 7,080,688 B2 | 7/2006 | Todd et al. |
| 7,093,664 B2 | 8/2006 | Todd et al. |
| 7,096,947 B2 | 8/2006 | Todd et al. |
| 7,101,829 B2 | 9/2006 | Guichard et al. |
| 7,131,491 B2 | 11/2006 | Blauch et al. |
| 7,140,438 B2 | 11/2006 | Frost et al. |
| 7,147,067 B2 | 12/2006 | Getzlaf |
| 7,151,077 B2 | 12/2006 | Prud'homme et al. |
| 7,156,174 B2 | 1/2007 | Roddy et al. |
| 7,165,617 B2 | 1/2007 | Lord et al. |
| 7,168,489 B2 | 1/2007 | Frost et al. |
| 7,172,022 B2 | 2/2007 | Reddy et al. |
| 7,178,596 B2 | 2/2007 | Blauch et al. |
| 7,195,068 B2 | 3/2007 | Todd |
| 7,204,312 B2 | 4/2007 | Roddy et al. |
| 7,219,731 B2 | 5/2007 | Sullivan et al. |
| 7,228,904 B2 | 6/2007 | Todd, et al. |
| 7,256,159 B2 | 8/2007 | Guichard et al. |
| 7,261,156 B2 | 8/2007 | Nguyen et al. |
| 7,264,051 B2 | 9/2007 | Nguyen et al. |
| 7,267,170 B2 | 9/2007 | Mang et al. |
| 7,303,014 B2 | 12/2007 | Reddy et al. |
| 7,306,037 B2 | 12/2007 | Nguyen et al. |
| 7,322,412 B2 | 1/2008 | Badalamenti et al. |
| 2001/0016562 A1 | 8/2001 | Muir et al. |
| 2002/0036088 A1 | 3/2002 | Todd |
| 2002/0119169 A1 | 8/2002 | Angel et al. |
| 2002/0125012 A1 | 9/2002 | Dawson et al. |
| 2003/0054962 A1 | 3/2003 | England et al. |
| 2003/0060374 A1 | 3/2003 | Cooke, Jr. |
| 2003/0114314 A1 | 6/2003 | Ballard et al. |
| 2003/0130133 A1 | 7/2003 | Vollmer |
| 2003/0147965 A1 | 8/2003 | Bassett et al. |
| 2003/0188766 A1 | 10/2003 | Banerjee et al. |
| 2003/0230407 A1 | 12/2003 | Vijn et al. |
| 2003/0234103 A1 | 12/2003 | Lee et al. |
| 2004/0014606 A1 | 1/2004 | Parlar et al. |
| 2004/0014607 A1 | 1/2004 | Sinclair et al. |
| 2004/0040706 A1 | 3/2004 | Hossaini et al. |
| 2004/0055747 A1 | 3/2004 | Lee |
| 2004/0070093 A1 | 4/2004 | Mathiowitz et al. |
| 2004/0094300 A1 | 5/2004 | Sullivan et al. |
| 2004/0099416 A1 | 5/2004 | Vijn et al. |
| 2004/0106525 A1 | 6/2004 | Willbert et al. |
| 2004/0138068 A1 | 7/2004 | Rimmer et al. |
| 2004/0152601 A1* | 8/2004 | Still et al. .................. 507/100 |
| 2004/0152602 A1 | 8/2004 | Boles |
| 2004/0162386 A1 | 8/2004 | Altes et al. |
| 2004/0170836 A1 | 9/2004 | Bond et al. |
| 2004/0214724 A1 | 10/2004 | Todd et al. |
| 2004/0216876 A1 | 11/2004 | Lee |
| 2004/0231845 A1 | 11/2004 | Cooke, Jr. |
| 2005/0028976 A1 | 2/2005 | Nguyen |
| 2005/0034861 A1 | 2/2005 | Saini et al. |
| 2005/0059556 A1 | 3/2005 | Munoz, Jr. et al. |
| 2005/0059557 A1 | 3/2005 | Todd et al. |
| 2005/0059558 A1 | 3/2005 | Blauch et al. |
| 2005/0103496 A1 | 5/2005 | Todd et al. |
| 2005/0126785 A1 | 6/2005 | Todd et al. |
| 2005/0130848 A1 | 6/2005 | Todd et al. |
| 2005/0183741 A1 | 8/2005 | Surjaatmadja et al. |
| 2005/0205266 A1 | 9/2005 | Todd et al. |
| 2005/0252659 A1 | 11/2005 | Sullivan et al. |
| 2005/0272613 A1 | 12/2005 | Cooke, Jr. |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0048938 A1 | 3/2006 | Kalman |
| 2006/0065397 A1 | 3/2006 | Nguyen et al. |
| 2006/0105917 A1 | 5/2006 | Munoz, Jr. et al. |
| 2006/0105918 A1 | 5/2006 | Munoz, Jr. et al. |
| 2006/0108150 A1 | 5/2006 | Luke et al. |
| 2006/0169182 A1 | 8/2006 | Todd et al. |
| 2006/0169450 A1 | 8/2006 | Mang et al. |
| 2006/0172891 A1 | 8/2006 | Todd et al. |
| 2006/0172894 A1 | 8/2006 | Mang et al. |
| 2006/0172895 A1 | 8/2006 | Mang et al. |
| 2006/0185847 A1 | 8/2006 | Saini et al. |
| 2006/0185848 A1 | 8/2006 | Surjaatmadja et al. |
| 2006/0234873 A1 | 10/2006 | Ballard |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schreiner et al. |
| 2007/0100029 A1 | 5/2007 | Reddy et al. |
| 2007/0173416 A1 | 7/2007 | Moorehead et al. |
| 2007/0235190 A1 | 10/2007 | Lord et al. |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| GB | GB 2 412 389 | 3/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/55843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 | 5/2004 |

OTHER PUBLICATIONS

Mabey. W. et al." Critical Review of Hydrolysis of Organic Compounds in Water under Environmental Conditions" J Phys Chem, Rev. Data, vol. 7, No. 2., 1978.

Economides, M.J. et al., "Reservoir Stimulation" Schulmberger Educational Services, pp. 13-1 to 13-13.

Simmons, et al., *Poly(phenyllactide): Synthesis, Characterization, and Hydrolytic Degradation*, Biomacromolecules, vol. 2, No. 2, 2001 (pp. 658-663).

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, Degradable Aliphatic Polyesters, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions, Halliburton Communications*, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Y. Chiang et al., *Hydrolysis Of Ortho Esters; Further Investigation Of The Factors Which Control The Rate-Determining Step*, Engineering Information, Inc. NY, NY, vol. 105, No. 23 (XP-002322842), Nov. 16, 1983.

M. Ahmad, et al., *Ortho Ester Hydrolysis: Direct Evidence For A Three-Stage Reaction Mechanism*, Engineering Information, Inc. NY, NY, vol. 101, No. 10 (XP-002322843), May 9, 1979.

Skrabal et al, *The Hydrolysis Rate Of Orthoformic Acid Ethyl Ether*, Chemical Institute of the University of Graz, Jan. 13, 1921, pp. 1-38, Jan. 31, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release* 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Kiyoshi Matsuyama et ai, Environmentally benign formation of polymeric microspheres by rapid expansion of supercritical carbon dioxide solution with a nonsolvent, Environ Sci Techno 12001, 35, 4149-4155.

* cited by examiner

METHODS OF CONTROLLED ACIDIZATION IN A WELLBORE

FIELD OF THE INVENTION

The present invention generally relates to hydrocarbon production, and more particularly to methods of obtaining controlled acidization in a well by placing an aqueous solution comprising one or more esters or polyesters of hydroxy acid or of glycerol in the well at locations where acidization is required.

BACKGROUND AND SUMMARY OF THE INVENTION

The following paragraphs contain some discussion, which is illuminated by the innovations disclosed in this application, and any discussion of actual or proposed or possible approaches in this Background section does not imply that those approaches are prior art.

Natural resources such as gas, oil, and water residing in a subterranean formation can be recovered by drilling wells into the formation. Well drilling involves drilling a wellbore down to the formation while circulating a drilling fluid through the wellbore. Various types of drilling fluids, also known as drilling muds, have been used in well drilling such as mineral oil-based fluids and synthetic oil-based fluids. Such drilling fluids typically form a thin, slick filter cake on the formation face that provides for successful drilling of the well bore and that helps prevent loss of fluid to the subterranean formation. In the hydrocarbon bearing portions of a formation, drilling fluids that produce filter cakes of cellulose and starch derivatives and sized calcium carbonate are often employed.

Several stages may be used to produce oil found in subterranean formations. The first stage, which is known as the primary production stage, allows the oil to flow into a production well (or wells) under natural forces. At first, the natural forces may be sufficient to drive the oil to the surface where it is recovered. However, at some point, pumps may be required to displace the oil from the wellbore to the surface. The primary production stage usually yields only about 5% to 15% of the oil in the reservoir. A secondary recovery operation thus is typically performed to recover additional amounts of the oil from the reservoir. A common secondary recovery operation known as secondary flooding involves injecting a fluid such as water into a so-called injection well (or wells) to drive oil in the formation to the production well (or wells). Secondary flooding usually recovers up to an additional 50% of the original oil in the reservoir. Tertiary recovery operations such as tertiary flooding may also be used to drive the remaining oil from the formation to the production well. Unfortunately, the presence of the filter cake on the face of the subterranean formation may adversely affect the flow of fluid though the injection and production wells. The filter cake may occlude the pore structure of the formation. In the case of the injection wells, particularly in deepwater environments, the injected fluid usually is not flowed back to remove the filter cake left by the drilling fluid. However, the pump pressures (e.g., fracturing pressures) required to inject past the filter cake may be higher than desirable for achieving good sweep efficiency of the oil.

A procedure known as acidization has been used for filter cake removal for over a century. In particular, the cellulose of which the filter cake is primarily composed may be decomposed by applying acid to the filter cake. It is believed that the first acidization procedure involved directly injecting strong mineral acids such as hydrochloric acid (HCl) into the well. However, the high reactivity of such strong acids commonly result in the rapid consumption of the acid before it can reach the desired treatment region where the filter cake was located. Further, such acids are highly corrosive and thus attack the metal parts of the well structure, causing irreversible damage to the well.

New acidization treatment solutions have been developed to overcome the problems associated with the use of mineral acids alone. For example, one such treatment solution includes hydrochloric acid emulsified in crude oil such that the aqueous phase, i.e. the solution of acid in water, is surrounded by a continuous oil phase emulsifier that prevents the acid from adversely affecting the metal parts of the well structure. See U.S. Pat. No. 1,922,154 to de Groote. A variation on this treatment solution uses a higher concentration of emulsifier to prolong the stability of the emulsion. See U.S. Pat. No. 2,050,932 to de Groote. Another treatment method involves removing any water in contact with the metal parts of the well before introducing HCl gas absorbed in a mineral oil that is practically immiscible with or insoluble in water to insulate the metal of the well from being attacked by the acid. See U.S Pat. No. 2,206,187 to Herbsman. Yet another method utilizes both an aqueous fluid and a non-aqueous fluid capable of forming or releasing an acid upon dilution with water. In particular, the well may be filled with oil to protect the metal from the acid, followed by pumping the aqueous fluid down to the formation. The non-aqueous fluid containing the acid-forming substance may then be introduced to the well. See U.S. Pat. No. 2,059,459 to Hund. A treatment solution that uses an ester, such as that derived from glycerol, as an emulsifying agent for an aqueous acid in oil is described in U.S. Pat. No. 2,681,889 to Menaul et al. The ester undergoes hydrolysis to break the emulsion and release the acid. A similar solution uses an acid anhydride such as acetic anhydride in a hydrocarbon carrier fluid to release acid upon reaction with water. See U.S. Pat. No. 2,863,832 to Perrine. A treatment solution comprising an anhydrous organic acid, such as formic acid, acetic acid, or propionic acid, in an anhydrous hydrocarbon has also been described in U.S. Pat. No. 2,910,436 to Alhambra et al. Unfortunately, such acids are as likely to be prematurely exhausted as mineral acids before reaching the desired treatment region. All of the above-mentioned patents are incorporated by reference herein.

One modern acidization method involves the generation of acids in the wellbore via the action of enzymes and suitable acid precursors. However, this method is limited by the heat tolerance of the particular enzyme being used and the breakdown temperature of the acid precursor. Treatment at high temperatures results in fast acid exhaustion and enzyme deactivation which results in poor filter cake removal. The enzymes and acid precursors thus need to be stored and handled at the well site carefully to avoid being exposed to relatively high temperatures due to heat and sunlight. Another method relies on the triggered release of acid via the lowering of the pH of an aqueous solution comprising an ortho ester to below about 7. Unfortunately, at elevated temperatures this release may occur in a relatively short period of time. Yet another method growing in popularity relies on the time-dependent reaction of certain esters, such as diethyleneglycol diformate, in an aqueous solution to generate acid such as formic acid. The esters currently being used for this purpose hydrolyze at relatively slow rates at temperatures less than 60° C. However, at higher temperatures those esters hydrolyze too quickly to allow the aqueous solution to be adequately dispersed across the entire filter cake before the acid is consumed. The filter cake removal thus may be localized to a proportionately small area when using such methods, further resulting in the premature loss of the acid-generating fluid through pores that have been unclogged by this localized removal. It is therefore desirable to develop an acidization method in which the acid-releasing reaction occurs at a relatively slow rate over a wide temperature range, particularly at relatively high temperatures.

Methods of Controlled Acidization in a Wellbore

Some teachings and advantages found in the present application are summarized briefly below. However, note that the present application may disclose multiple embodiments, and not all of the statements in this section necessarily relate to all of those embodiments. Moreover, none of these statements limit the claims in any way.

An improved acidization solution comprising an aqueous medium and one or more esters or polyesters of a hydroxy acid or of a glycerol may be placed in a well. In embodiments in which the solution comprises an ester or polyester of a glycerol, the solution is substantially absent of a hydrocarbon such as an oil. The hydrolysis of such esters or polyesters occurs at a slower reaction rate than that of other known acidization esters, such as diethyleneglycol diformate, at temperatures higher than 60° C. or even higher than 100° C. Thus, the improved acidization solution may be distributed substantially throughout a region in the well where acidization is required before hydrolysis is completed, despite being exposed to relatively high temperatures. The hydrolysis may result in the slow release of an acid that is capable of consuming undesirable substances in the well, e.g., a filter cake, without being concerned that this consumption might be localized. Moreover, the strength of this acid may be greater than that of the acid formed by diethyleneglycol diformate, i.e., formic acid. Accordingly, the use of esters or polyesters of hydroxy acid or of glycerol for downhole acidization procedures provides for the removal of all or most of the filter cake present in the well.

DETAILED DESCRIPTION OF THE PREFERRED EMBODIMENTS

Figure 1:
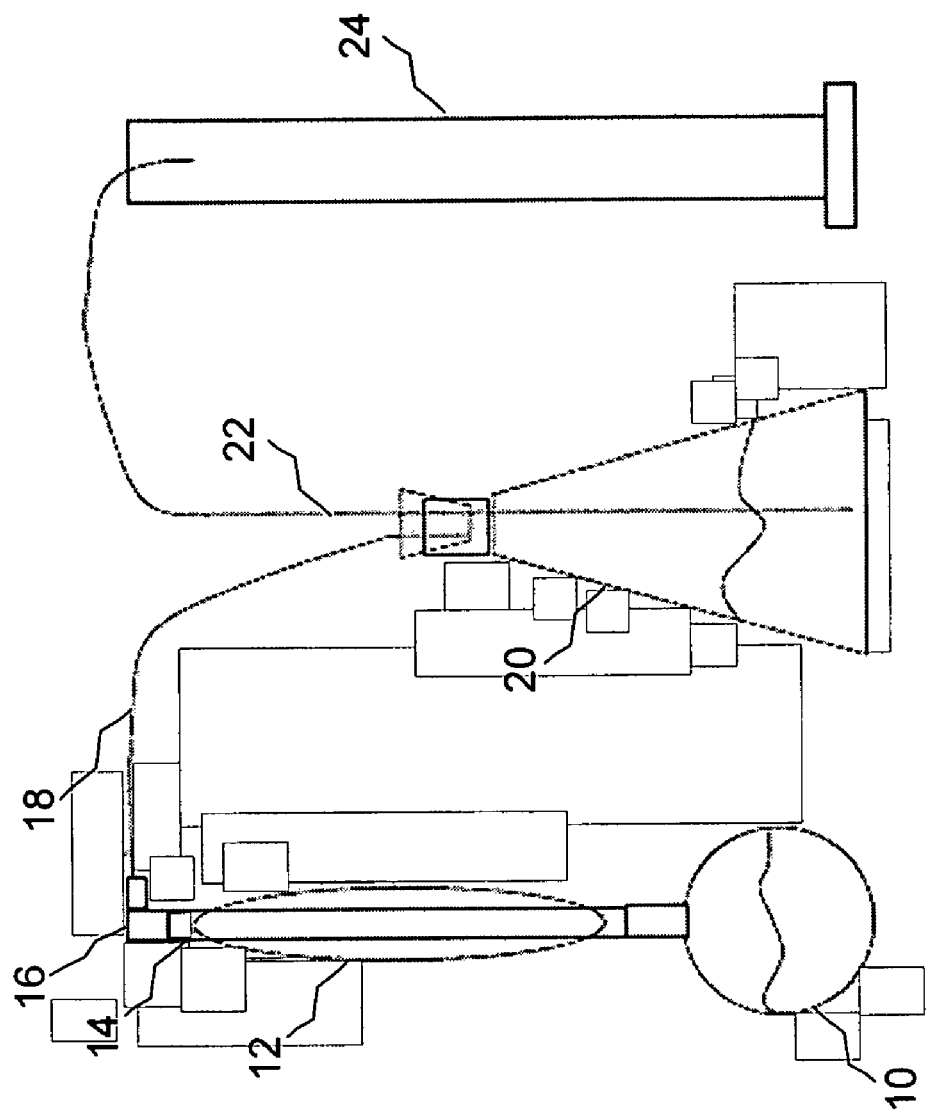
FIG. 1 depicts an ester hydrolysis apparatus used in the examples provided below.

Well treatment compositions, particularly compositions for performing downhole acidization, may include water combined with (a) one or more esters or polyesters of a hydroxy acid, e.g., lactic acid, and/or (b) one or more esters or polyesters of a glycerol in the absence of a hydrocarbon such as an oil. Such esters or polyesters exhibit a relatively high solubility in the water and are capable of undergoing hydrolysis to produce an acid when exposed to a temperature in a range of from about 60° C. to about 150° C. For example, lactate esters or polyesters release lactic acid when hydrolyzed. The relative amounts of the esters or polyesters and the water in the well treatment compositions may be effective to produce an effective amount of acid to remove most or all of a contaminant in the well such as a filter cake. In various embodiments, the amount of the esters or polyesters present in the aqueous treatment composition is in the range of from about 10% to about 23% by weight or volume of the composition.

Examples of suitable hydroxy acid esters or polyesters for use in the well treatment compositions include lactic acid derivatives, methyl lactate, ethyl lactate, propyl lactate, butyl lactate, trilactin (a trimester of lactic acid and glycerol), and combinations thereof. Ethyl lactate is considered a particularly good lactate ester due to its ability to hydrolyze over the wide temperature range of from about 60° C. to about 150° C., with its half-life being particularly useful at temperatures ranging from about 80° C. to about 140° C. Further, ethyl lactate is relatively inexpensive and is available worldwide, whereas other esters typically have limited availability. For example, diethyleneglycol diformate has an availability limited to Europe and possibly Africa. Examples of suitable esters or polyesters of glycerol for use in the well treatment compositions include tripropionin (a triester of propionic acid and glycerol), trilactin, and esters of acetic acid and glycerol such as monoacetrin, diacetin, and triacetin. Various combinations of the esters or polyesters of hydroxy acid and/or glycerol also may be employed to adjust the half-life of the hydrolysis reaction.

The water contained in the well treatment compositions may be pure (i.e., neutral) water or salt water. In various embodiments, the water may comprise one or more brines capable of forming well treatment compositions having pH values in the range of from about 6 to about 8. Examples of such brines include sodium bromide (NaBr) brine, calcium chloride ($CaCl_2$) brine, sodium formate (NaCOOH) brine, potassium formate (KCOOH) brine, calcium bromide ($CaBr_2$) brine, potassium chloride (KCl) brine, sodium chloride (NaCl) brine, zinc chloride (ZnCl) brine, zinc bromide (ZnBr) brine, and combinations thereof. The choice of brine is usually determined primarily by the weight of fluid desired.

In additional embodiments, the well treatment compositions may include one or more other types of esters for adjusting the half-life of the hydrolysis reaction. For example, diethyleneglycol diformate may be employed in a treatment composition along with an ester or polyester of a hydroxy acid or of a glycerol to reduce the half-life thereof. The diethyleneglycol diformate therefore could be used to shorten the completion time of the well. It forms formic acid as a result of hydrolysis and is commercially available from Halliburton Energy Services, Inc. under the trade name of BDF-325 diethyleneglycol diformate. Examples of other esters with which the esters or polyesters described herein may be combined include diethyleneglycolmonoformate, monoethyleneglycoldiformate, monoethyleneglycolmonoformate, and combinations thereof. Similarly, other esters could be added in conjunction with the esters or polyesters described herein to give faster rates of reaction as necessary.

The foregoing well treatment compositions may be prepared by mixing the one or more esters or polyesters and any other components with water on-site near the well before the acidization operation is to be performed. Alternatively, the components of the treatment compositions could be mixed off-site and transported on-site for storage until its use; however, the extra space required to accommodate the water, both during transport and during storage, makes this option less desirable. In addition, mixing beforehand would require the components to be kept well below 60° C. to avoid hydrolysis of the ester or polyester prior to its addition to the wellbore.

Methods of acidizing a well may be performed by pumping a well treatment composition described herein down the well. The temperatures in the well may be sufficient to enable the hydrolysis reaction between the one or more esters or polyesters and the water to occur. For example, the temperatures may be in the range of from about 60° C. to about 150° C. The half-life of the one or more lactate esters or polyesters may be effective to allow the treatment composition to be pumped substantially throughout a region in the well where the acidization is required before the hydrolysis is completed. In various embodiments, the one or more lactate esters or polyesters have half-lives in a range of from about 6 hours to about 16 hours, alternatively from about 8 hours to about 13 hours, or alternatively from about 10 hours to about 11 hours, when hydrolyzed with neutral water at 100° C. Particular examples of the half-lives of various esters of lactic acid and of glycerol are presented in Table 1 below. As used herein, "half-life" refers to the time it takes for half of the original amount of the ester or polyester to react.

TABLE 1

| Ester | Half-Life in Neutral Water at 100° C. (seconds) | Pseudo First Order Rate Constant (sec.$^{-1}$) |
| --- | --- | --- |
| Triacetin | 9,840 | $7.04 \times 10^{-5}$ |
| Diacetin | 14,600 | $4.75 \times 10^{-5}$ |
| Monoacetin | 38,400 | $1.8 \times 10^{-5}$ |
| Tripropionin | 32,344.83 | $1.05 \times 10^{-5}$ |
| Methyl lactate | 9,746.19 | $2.1 \times 10^{-5}$ |
| Ethyl Lactate | 31,363.63 | $2.2 \times 10^{-5}$ |
| Propyl lactate | 93,033.7 | $7.4 \times 10^{-6}$ |
| Butyl lactate | 76,704.55 | $9.03 \times 10^{-6}$ |

Based on Table 1 the half-lives of such esters at relatively high temperatures are longer than that of other known acidization esters, e.g., diethyleneglycol diformate, which produces formic acid. For example, the half-life of ethyl lactate may be about 10-11 hours, whereas the half-life of diethyleneglycol diformate may be about only 18-20 minutes in neutral water at 100° C. Thus, the reaction of such esters with water proceeds at a slower rate, allowing the treatment composition to be diverted throughout the entire targeted treatment region in the well before the hydrolysis reaction is completed. The production of acid via the hydrolysis reaction occurs during the opportune time at which the acid is in contact with undesirable substances in the well. Moreover, the strength of the acid (e.g., the pH of acetic acid=4.76, the pH of propionic acid=4.86; and the pH of lactic acid=3.08 at 100° C.) is relatively high, and in the case of lactic acid, is even higher than that of formic acid (pH=3.75 at 100° C.). Therefore, the acid may consume all or most of the undesirable substances before all of the ester or polyester is consumed. The choice of which ester or polyester to use in the treatment composition may be based on the application temperature and desired half-life of the ester or polyester.

In various embodiments, the well treatment composition may be used during a well completion operation such as the removal of filter cake from the inner wall of the well. The relatively slow reaction rate of the one or more esters or polyesters may permit the treatment composition to be dispersed across the entire filter cake before the hydrolysis ends. The acid generated by the hydrolysis may decompose calcium carbonate present in the filter cake, which is a major component in the filter cake. The removal of the filter cake ensures that oil, gas, and/or water residing in a subterranean reservoir penetrated by the well can flow into and through the well during production. Otherwise, the filter cake might block migration pathways such as pores in the earth between the reservoir and the interior of the well, thereby preventing the oil, gas, and/or water from permeating through to the well.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

In the following examples, various ester hydrolysis reactions were run in the presence of calcium carbonate ($CaCO_3$) to simulate the consumption of filter cake material. The acid evolved in each reaction was measured per unit of time. The acid generated upon hydrolysis was rapidly consumed in a secondary reaction that produced carbon dioxide ($CO_2$). The half-life was secured when half of the $CaCO_3$ was consumed. That is, using $PV=nRT$, the amount of $CaCO_3$ that would yield approximately 1 liter of $CO_2$ was calculated to be about 4.47 grams. We doubled the amount of $CaCO_3$ (8.94 grams) for the reactions and then calculated the half-life based on the yield of 1 liter of $CO_2$. Unless otherwise specified, all half-life quotations are actually the time required for 4.47 grams of $CaCO_3$ to be consumed.

The following general procedure was used in each of the examples. The closed system reactor shown in FIG. 1 was used to measure the amount of $CO_2$ gas that evolved in each reaction. Water or brine was added to a boiling flask 10, which was heated to 100° C. The $CaCO_3$ was insoluble in the water and thus was observed at the bottom of flask 10. Once the liquid was boiling, a weighed amount of ester was added to flask 10. The amount of ester employed was always in ratio to the water or to the make-up water used to formulate the brine except where commercially available brines were used. Following addition of the ester to the boiling liquid, a reflux condenser 12 was affixed to flask 10. The top of condenser 12 was fixed with an adapter 14 to an inlet tube 18 in a 2-hole rubber stopper 16. The inlet tube 18 was passed through stopper 16, providing a seal. An outlet tube 22 was run from the bottom of a flask 20 to a 1,000 mL graduated cylinder 24. The flask 20 was charged with XP-07 base oil, commercially available from Halliburton Energy Services, Inc. The outlet tube 22 served the purpose of discharging the oil into graduated cylinder 24. The hydrolysis reaction produced acid in flask 10 that reacted with the $CaCO_3$ to produce $CO_2$ gas. The gas displaced the oil in flask 20 into graduated cylinder 24. The rate of $CO_2$ evolution thus could be monitored visually by reading of the amount of oil in graduated cylinder 24 per unit of time. A half-life of greater than 10 hours at 100° C. was desired.

Example 1

Figure 2:
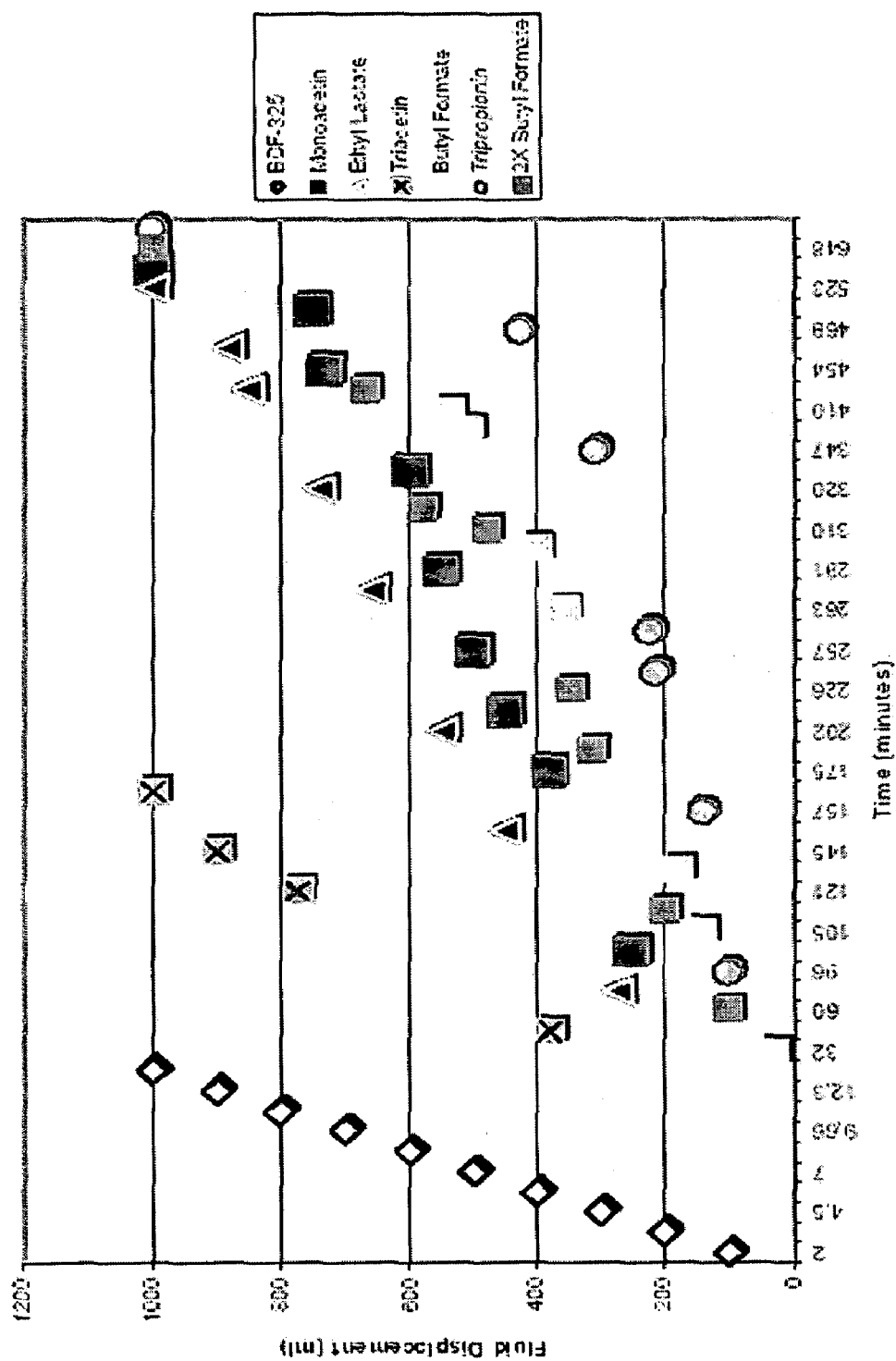
FIG. 2 illustrates the hydrolysis of various esters described herein and of some control esters in pure water at 100° C.

Solutions containing various esters of lactic acid and of glycerol (i.e., monoacetin, ethyl lactate, triacetin, tripropionin), butyl formate (a control), and BDF-325 diethyleneglycol diformate (a control) in neutral water were prepared and combined with a molar ratio of $CaCO_3$. Hydrolysis reactions were then carried out using the resulting solutions at 100° C. The hydrolysis reactions were monitored, and the half-lives of the esters were compared. The volume of oil displaced by the $CO_2$ gas is plotted as a function of time in FIG. 2. The half-lives of the esters of lactic acid and of glycerol were longer than that of the BDF-325 diethyleneglycol diformate. The butyl formate to $CaCO_3$ molar ratio was doubled for comparison purposes. The curve for the 1:1 molar ratio reaction was surprisingly similar to that for the 2:1 molar ratio reaction. Doubling the molar ratio of the butyl formate should have lead to an increase in the relative reaction rate; however, this did not happen. It is believed that this behavior was due to the relative insolubility of the butyl formate since the rate of hydrolysis was determined by the concentration of the butyl formate in solution and not by the amount added.

Example 2

Figure 3:
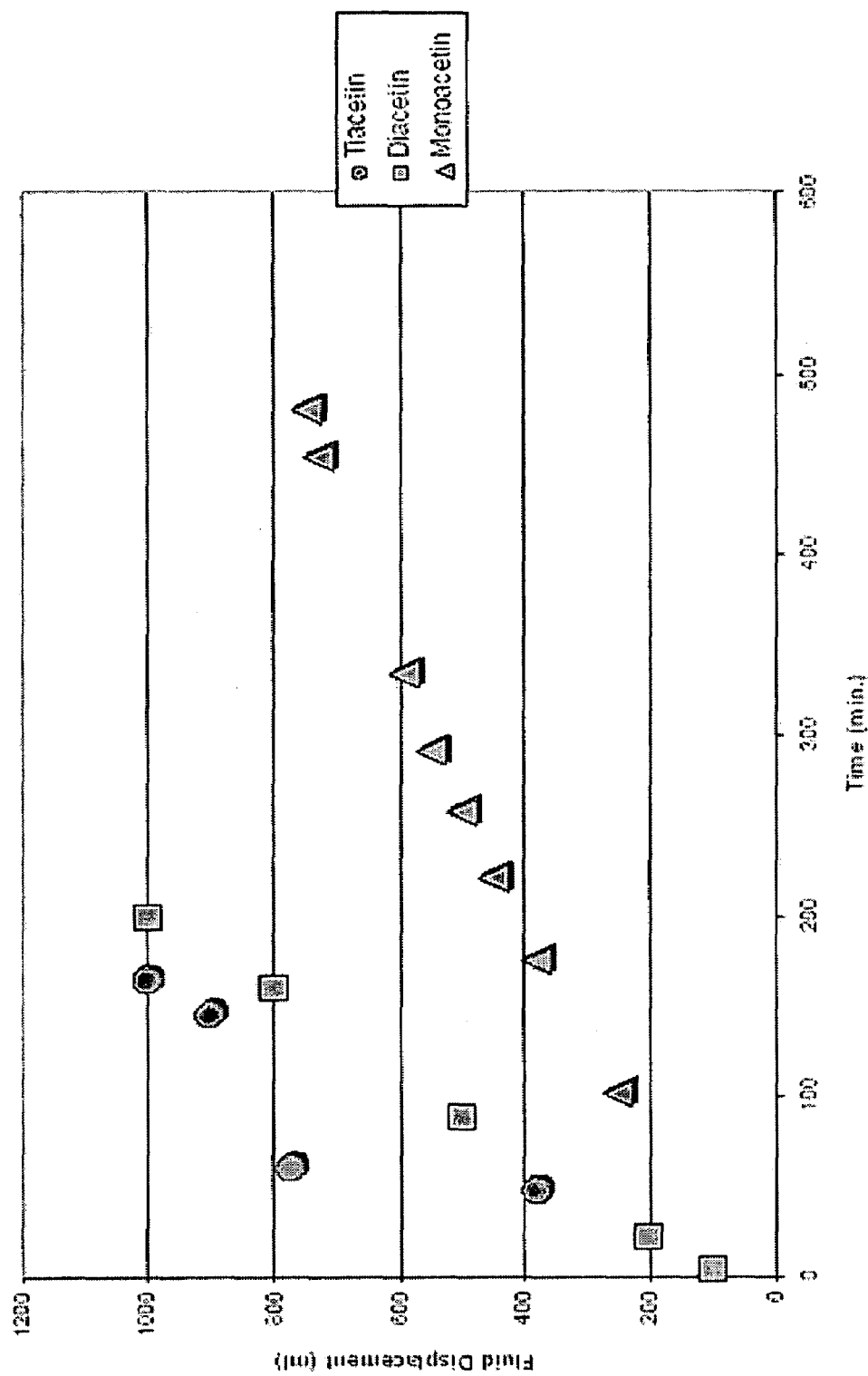
FIG. 3 illustrates the hydrolysis of various acetins in neutral water at 100° C.

Solutions containing 10 volume % monoacetin, diacetin, and triacetin in deionized water were prepared and combined with a molar ratio of $CaCO_3$. Hydrolysis reactions were then carried out using the resulting solutions at 100° C. The hydrolysis reactions were monitored, and the half-lives of the esters were compared. The volume of oil displaced by the $CO_2$ gas is plotted as a function of time in FIG. 3. The hydrolysis rates of the triacetin and the diacetin were very similar. However, the monoacetin consumed 4-5 times more slowly relative to the other two acetins, and the monoacetin displayed a half-life within the targeted range. It is believed that the presence of the two hydroxyl groups in monoacetin slowed the rate of hydrolysis through hydrogen bonding with water. Another theory relies on the fact that monoacetin is a mixture of isomers. The acetate group may be on either a primary hydroxyl group or a secondary group. One isomer may be more reactive than the other. Despite the slight differences in rate between the triacetin and the diacetin, it is not believed that the differences in rate are the result of a kinetic effect since triacetin has three acetate groups and monoacetin has one. Thus, the differences in rate may be related to hydrogen bonding.

Example 3

Figure 4:
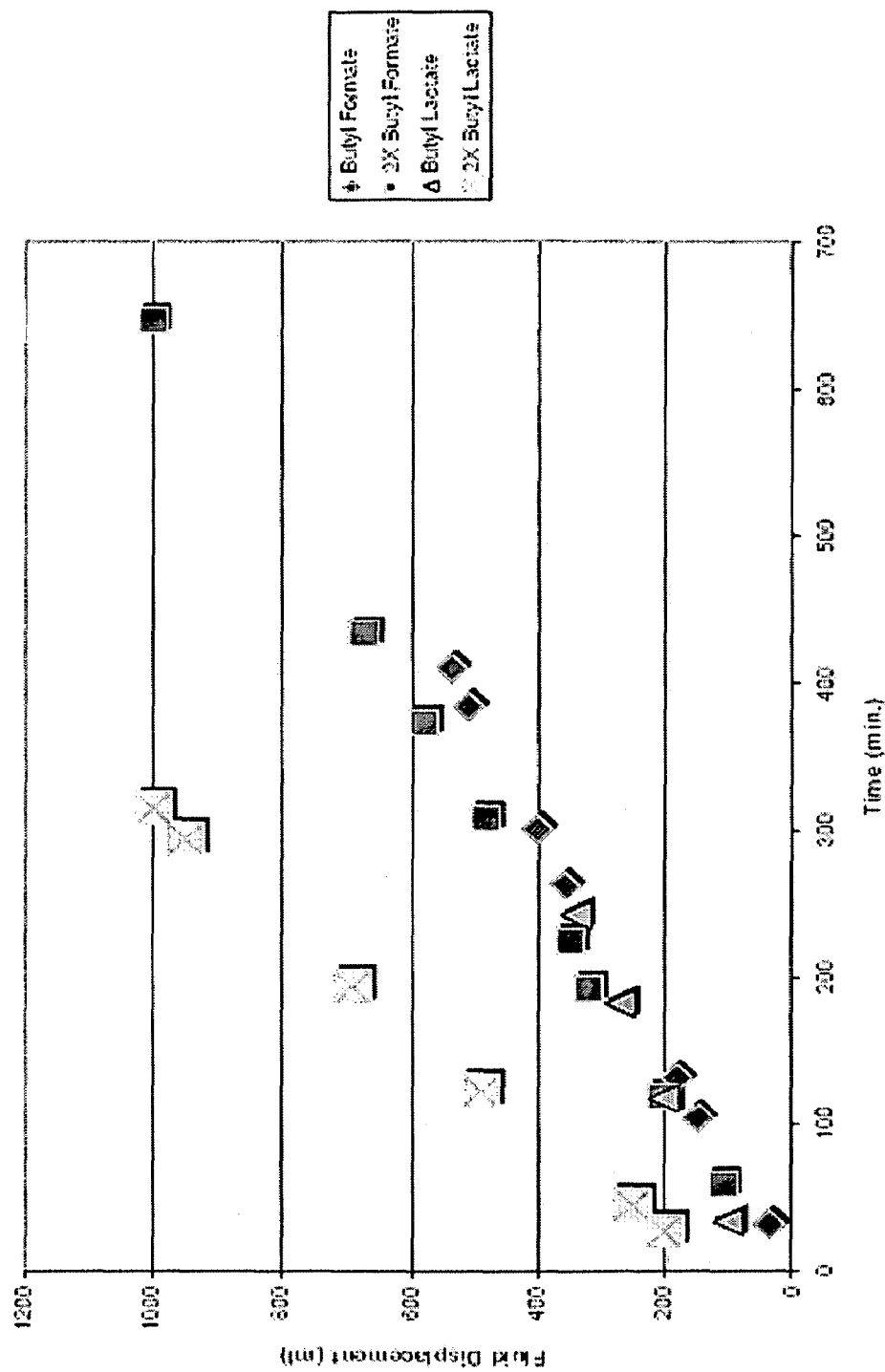
FIG. 4 illustrates the hydrolysis of butyl formate and butyl lactate in neutral water at 100° C.

Solutions containing butyl lactate and butyl formate (a control) in deionized water were prepared and combined with a molar ratio of $CaCO_3$. Similar solutions in which the butyl formate and butyl lactate to $CaCO_3$ molar ratio were doubled were also prepared for comparison purposes. Hydrolysis reactions were then carried out using the resulting solutions at 100° C. The hydrolysis reactions were monitored, and the half-lives of the esters were compared. The volume of oil displaced by the $CO_2$ gas is plotted as a function of time in FIG. 4. The reaction rate of the butyl lactate was faster than that of the butyl formate. This difference in reaction rates was probably due to the difference in solubilities of these two compounds in water. That is, butyl lactate is slightly soluble in water while butyl formate exhibits poor solubility in water. Doubling the concentration of butyl lactate doubled its reaction rate. The poor solubility of butyl formate governed its slow reaction rate, making it unsuitable for use in the acidization of a well. This behavior indicates that an ester needs to be soluble in the aqueous phase before any appreciable reaction can take place.

Example 4

Figure 5:
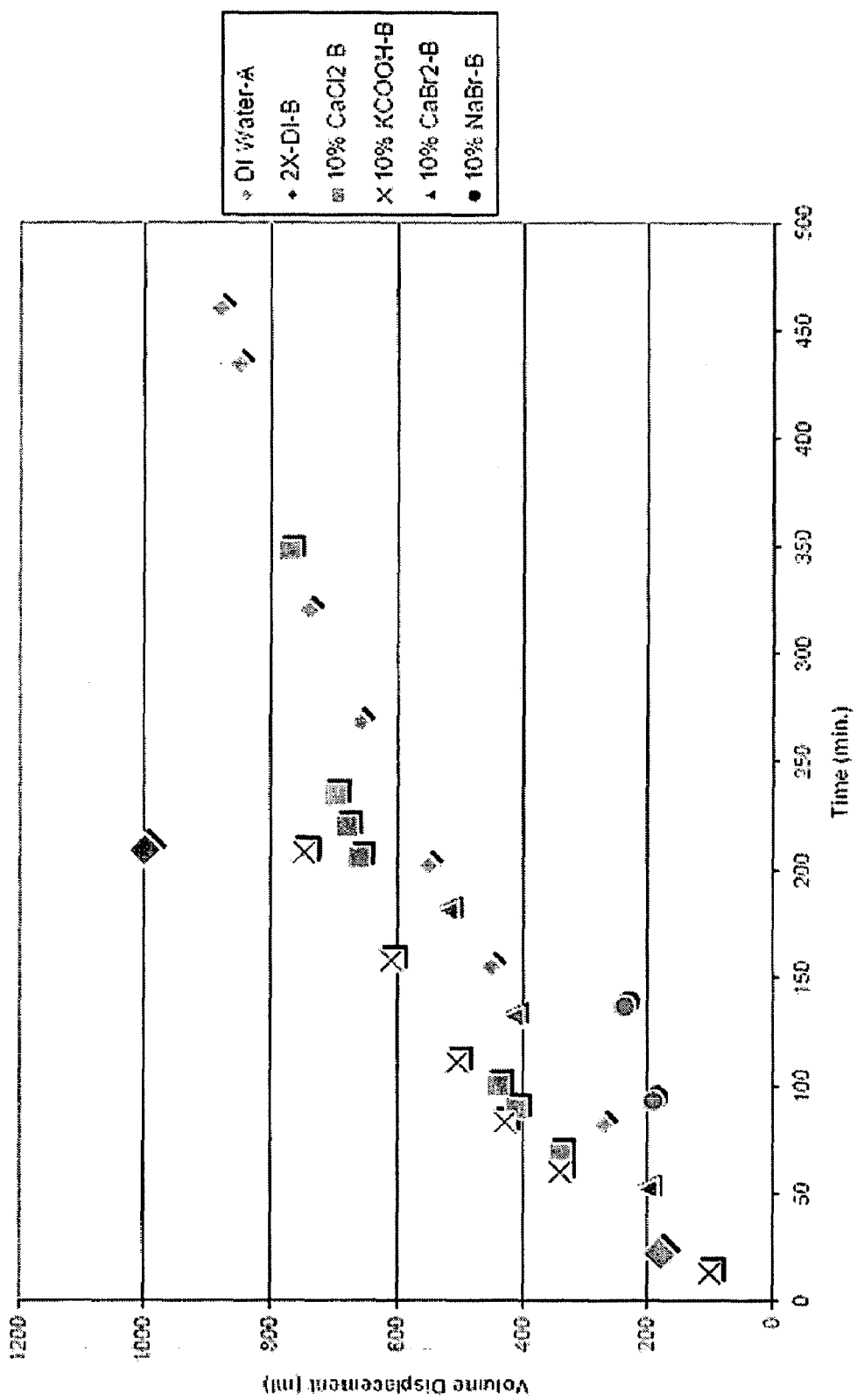
FIG. 5 illustrates the hydrolysis of ethyl lactate in neutral water and in various brines at 100° C.
Figure 6:
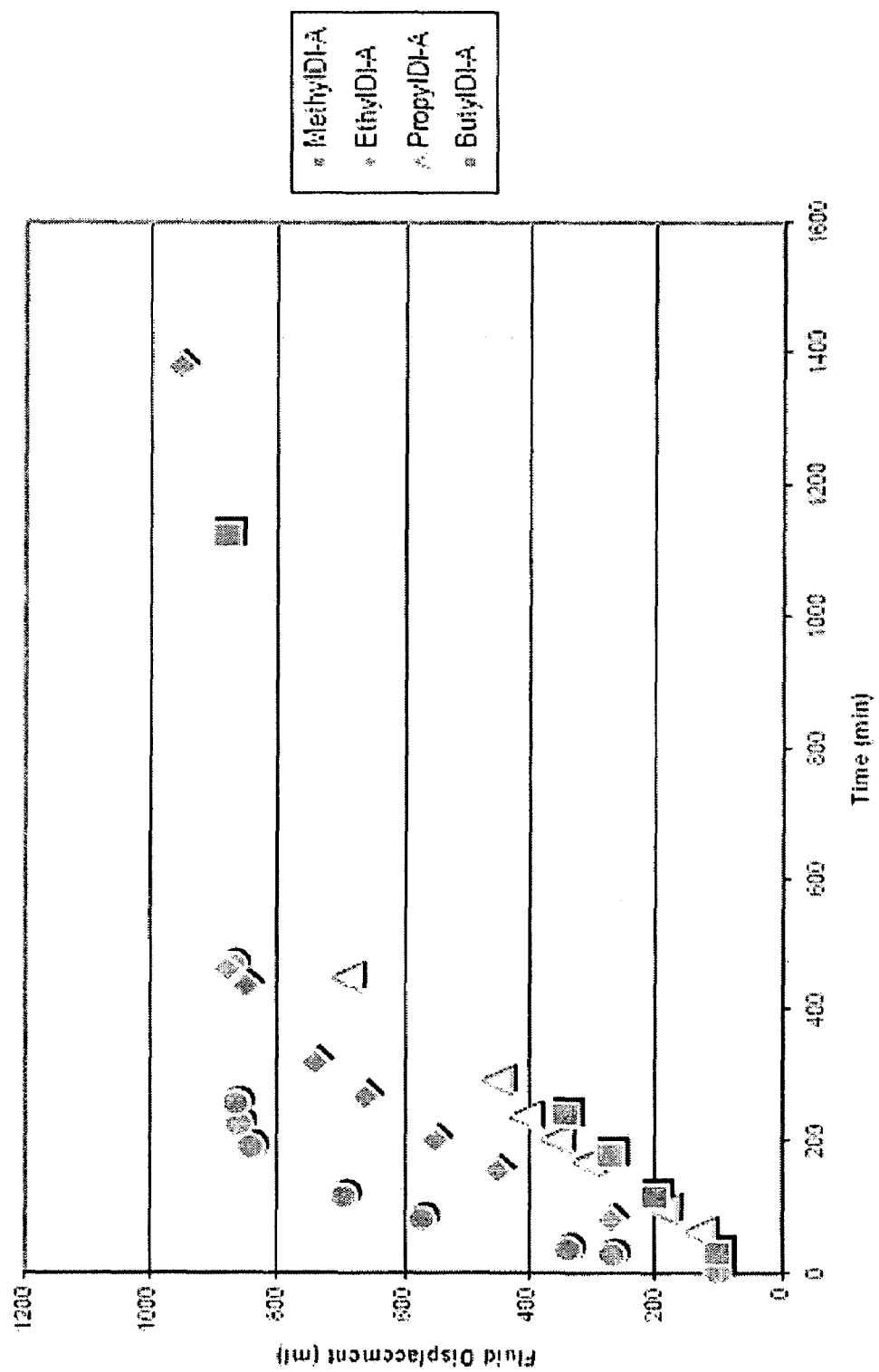
FIG. 6 illustrates the hydrolysis of methyl-, ethyl-, propyl-, and butyl- lactate esters in neutral water at 100° C.

Solutions containing 10 volume % ethyl lactate in deionized water and various brines were prepared and combined with a molar ratio of $CaCO_3$. Hydrolysis reactions were then carried out using the resulting solutions at 100° C. The hydrolysis reactions were monitored, and the half-lives of the esters were compared. The volume of oil displaced by the $CO_2$ gas is plotted as a function of time in FIG. 5. The ethyl lactate performed consistently in the different aqueous solutions. These results indicate that ethyl lactate would be very suitable for use in the acidization of a well.

Example 5

Solutions containing 10 volume % methyl-, ethyl-, propyl-, and butyl- lactate in deionized water were prepared and combined with a molar ratio of $CaCO_3$. Hydrolysis reactions were then carried out using the resulting solutions at 100° C. The hydrolysis reactions were monitored, and the half-lives of the esters were compared. The volume of oil displaced by the $CO_2$ gas is plotted as a function of time in FIG. 5. The reaction velocities of the lactate esters decreased as the relative reaction rates of the esters decreased based on the following order:

methyl->ethyl->propyl->butyl

In various embodiments, methods of acidizing in a well comprise placing an ester or polyester of a hydroxyl acid and water in the well, thereby allowing the ester or polyester to undergo hydrolysis. In more embodiments, methods of acidizing in a well comprise placing an aqueous solution comprising an ester or polyester of glycerol in a well, thereby allowing the ester or polyester to undergo hydrolysis, wherein the aqueous solution is substantially absent of a hydrocarbon. In further embodiments, well treatment compositions for performing acidization in a well comprise an ester or polyester of a hydroxy acid and water. In more embodiments, well treatment compositions for performing acidization in a well comprise an ester or polyester of a glycerol and water.

MODIFICATIONS AND VARIATIONS

In additional embodiments, the acidization procedure described herein also may be employed to repair damage to the subterranean formation surrounding the well. This damage may be in the form of hydrocarbon wax deposits and/or inorganic salt deposits, such as calcium carbonate deposits, in the pores of a lime sand, lime stone, calcareous, or magnesium formation. Such inorganic salt deposits may occur as a result of subterranean water becoming saturated with alkaline earth carbonates under pressure, followed by the precipitation of the carbonates when the pressure is released after the drill-in of the well. The lactic acid produced by the hydrolysis of the lactate ester or polyester may attack and dissolve the wax and salt deposits, thus increasing the porosity of the formation.

In alternative embodiments, the one or more lactate esters or polyesters and the water may be added to different types of carrier fluids commonly used in the well. Examples of suitable carrier fluids include but are not limited to a gravel packing fluid, a drilling fluid, a completion fluid, a displacement fluid, and a work-over fluid, all of which are known in the art.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of acidizing in a well, comprising:
   placing an ester of a hydroxy acid and water in the well,
   allowing the ester to undergo hydrolysis to form a hydroxy acid, and
   allowing the hydroxy acid to remove at least a portion of a filter cake from the well.

2. The method of claim 1, wherein the ester of the hydroxy acid undergoes the hydrolysis when exposed to a temperature in a range of from about 60° C. to about 150° C. in the well.

3. The method of claim 1, wherein a half-life of the ester of the hydroxy acid is effective to allow it to be pumped substantially throughout a region in the well where the acidization is required before the hydrolysis of the ester is completed.

4. The method of claim 1, wherein the ester of the hydroxy acid has a half-life in a range of from about 6 to about 16 hours when hydrolyzed with neutral water at 100° C.

5. The method of claim 1, wherein the ester of the hydroxy acid has a half-life in a range of from about 8 to about 13 hours when hydrolyzed with neutral water at 100° C.

6. The method of claim 1, wherein the ester of the hydroxy acid comprises lactic acid derivatives, methyl lactate, ethyl lactate, propyl lactate, butyl lactate, trilactin, or combinations thereof.

7. The method of claim 1, further comprising combining the ester of the hydroxy acid with another type of ester before placing it in the well.

8. The method of claim 7, wherein the another type of ester comprises diethyleneglycol diformate, diethyleneglycolmonoformate, monoethyleglycoldifomate, monoethyleneglycolmonoformate, or combinations thereof.

9. The method of claim 1, wherein the water comprises neutral water or salt water such as a brine.

10. The method of claim 1, wherein the hydroxy acid formed by the hydrolysis is used to repair the subterranean formation.

11. The method of claim 1, wherein the ester of the hydroxy acid comprises at least one ester selected from the group consisting of: methyl lactate, ethyl lactate, butyl lactate, and hexyl lactate.

12. The method of claim 1, further comprising:
    placing a polyester of a hydroxy acid and water in the well, and
    allowing the polyester to undergo hydrolysis.

13. A method of acidizing in a well, comprising:
    placing an aqueous solution comprising an ester or polyester of a glycerol in a well, wherein the aqueous solution is substantially absent of a hydrocarbon,
    allowing the ester or polyester to undergo hydrolysis to form a hydroxy acid and,
    allowing the hydroxy acid to degrade a least a portion of a filter cake.

14. The method of claim 13, wherein the temperature effective for the hydrolysis reaction is in a range of from about 60° C. to about 150° C. in the well.

15. The method of claim 13, wherein a half-life of the ester or polyester of the glycerol is effective to allow it to be pumped substantially throughout the region in the well where the acidization is required.

16. The method of claim 13, wherein the ester or polyester of the glycerol has a half-life in a range of from about 6 to about 16 hours when hydrolyzed with neutral water at 100° C.

17. The method of claim 13, wherein the ester or polyester of the glycerol has a half-life in a range of from about 8 to about 13 hours when hydrolyzed with neutral water at 100° C.

18. The method of claim 13, wherein the ester or polyester of the glycerol comprises triacetin, diacetin, monoacetin, tripropionin, trilactin, or combinations thereof.

19. The method of claim 13, wherein the aqueous solution comprises neutral water or salt water such as a brine.

20. The method of claim 13, further comprising combining the ester or polyester of the glycerol with another type of ester before placing it in the well.

21. The method of claim 20, wherein the another type of ester comprises diethyleneglycol diformate, diethyleneglycolmonoformate, monoethyleglycoldiformate, monoethyleneglycolmonofrmate or combinations thereof.

22. The method of claim 13, wherein an acid formed by the hydrolysis is used to repair a subterranean formation adjacent to the well.

* * * * *